(12) United States Patent
Grote, Jr.

(10) Patent No.: US 7,821,380 B1
(45) Date of Patent: Oct. 26, 2010

(54) COMPACT WARNING LIGHT

(75) Inventor: William F. Grote, Jr., Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 475 days.

(21) Appl. No.: 11/903,026

(22) Filed: Sep. 20, 2007

(51) Int. Cl.
*G08B 3/10* (2006.01)
(52) U.S. Cl. .................... 340/384.4; 340/472; 340/473; 362/493; 362/542
(58) Field of Classification Search .............. 340/425.5, 340/471–473, 384.4, 815.45; 361/704–719; 362/493–542; 224/322, 329, 325
See application file for complete search history.

(56) References Cited

U.S. PATENT DOCUMENTS

| | | | | |
|---|---|---|---|---|
| 3,408,624 | A * | 10/1968 | Kennelly | 340/472 |
| 3,677,451 | A * | 7/1972 | Burland | 224/322 |
| 3,739,336 | A * | 6/1973 | Burland | 340/472 |
| 4,577,178 | A * | 3/1986 | Hitora | 362/232 |
| 4,620,268 | A | 10/1986 | Ferenc | |
| 5,027,260 | A | 6/1991 | Lyons et al. | |
| 5,452,188 | A * | 9/1995 | Green et al. | 362/493 |
| 5,988,839 | A | 11/1999 | Pokorney et al. | |
| 6,158,700 | A * | 12/2000 | Shieh | 248/74.2 |
| 6,583,988 | B1 | 6/2003 | Lyons et al. | |
| 6,682,210 | B1 | 1/2004 | Ford et al. | |
| 6,722,776 | B1 | 4/2004 | Lyons et al. | |
| 6,845,893 | B2 | 1/2005 | Nelson | |
| 6,863,424 | B2 | 3/2005 | Smith | |
| 6,966,682 | B2 * | 11/2005 | Frank et al. | 362/544 |
| 7,064,674 | B2 * | 6/2006 | Pederson | 340/815.45 |
| 7,404,658 | B1 * | 7/2008 | Lyons et al. | 362/542 |

* cited by examiner

*Primary Examiner*—Brent Swarthout
(74) *Attorney, Agent, or Firm*—Alix, Yale & Ristas, LLP

(57) ABSTRACT

A warning light comprising a base member, a dome removeably connected to the base member, and at least one light module having a top and bottom surface positioned within the dome with the top surface being positioned against the inside of the top surface of said dome. A bracket member secures the warning light to the dome. The bracket includes a cross bar engaging the bottom surface of the warning light and legs extending upward from the cross bar and terminating in a foot portion which is attached to the inside of the top surface of the dome.

18 Claims, 6 Drawing Sheets

US 7,821,380 B1

COMPACT WARNING LIGHT

BACKGROUND OF INVENTION

1. Field of Invention

This application relates to a warning light for use in vehicles for emergency response. More particularly, this disclosure relates to a compact warning light for use in vehicles for emergency response which contains a plurality of individual light modules.

2. Background

Warning lights for use in vehicles for providing a signal light for emergency response are well known. Such warning lights may be in the form of a lightbar, beacon, or light head and generally include a base, a dome and a plurality of light modules attached to the base and positioned within the dome when the dome is attached to the base. When it was desired to change the light modules to a different configuration or color, the dome would be removed and the base member would have to remain with the vehicle if attached thereto. The new light modules would have to be installed into the base while the base was in the vehicle. Additionally, if the dome were to be changed as well as the light modules, it was necessary to provide the light module and dome as separate components which must be transported to the location of the base individually and then connected together.

SUMMARY OF THE INVENTION

In accordance with one aspect there is provided a warning light comprising a base member, a dome connected to the base member, and a plurality of light modules positioned in the dome and secured thereto.

In accordance with another aspect there is provided a warning light comprising a base member, a dome removeably connected to the base member, and at least one light module having a top and bottom surface positioned within the dome with the top surface being positioned against the inside of the top surface of said dome. A bracket member secures the warning light to said dome. The bracket includes a cross bar engaging the bottom surface of the warning light and legs extending upward from the cross bar and terminating in a foot portion which is attached to the inside of the top surface of the dome.

DETAILED DESCRIPTION

Figure 1:
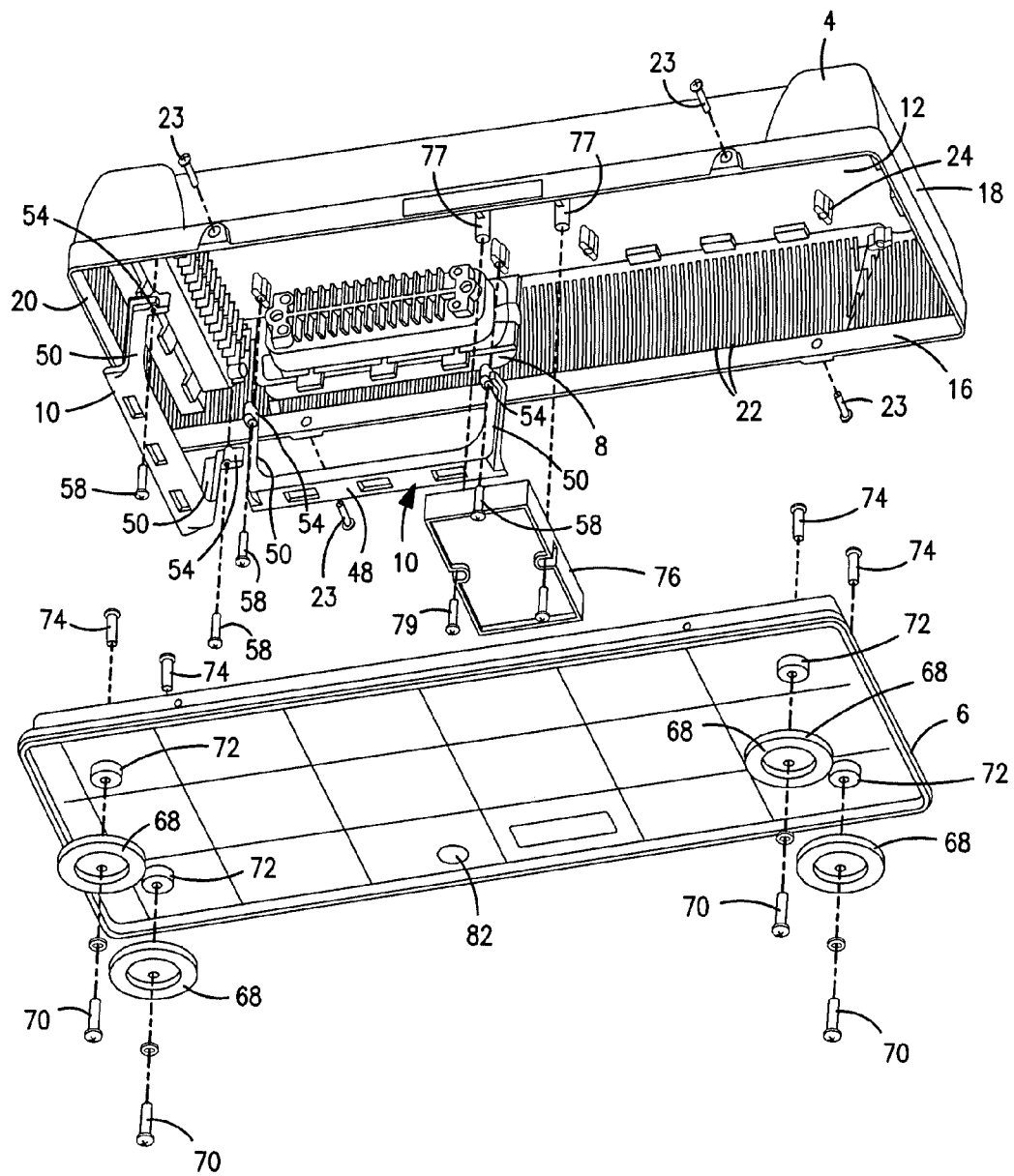
FIG. 1 is an exploded isometric view of a warning light viewing the warning light from the bottom.
Figure 5:
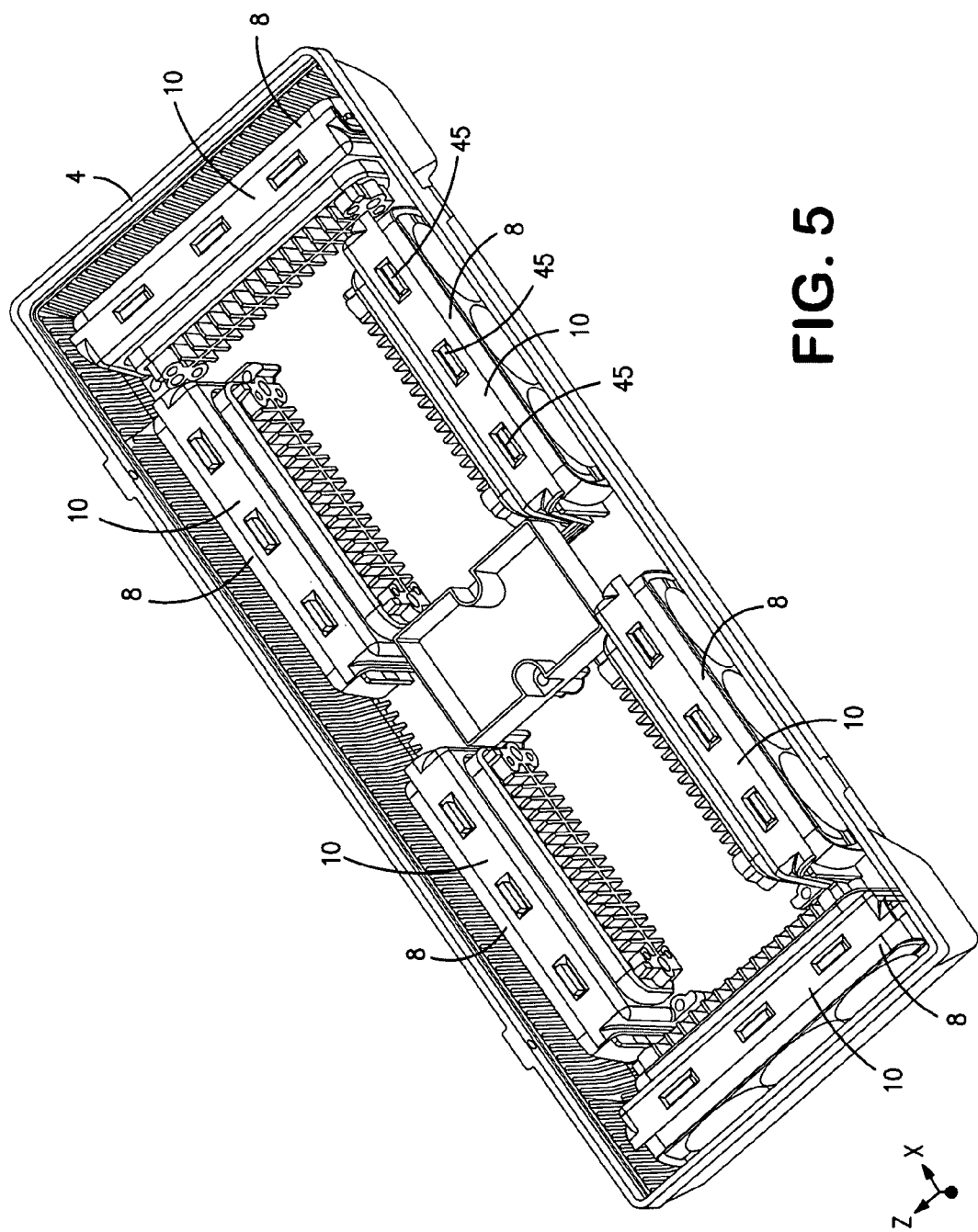
FIG. 5 is an isometric view looking upwardly into the dome of the warning light showing the light modules mounted within the warning light.

Referring to the drawings and particularly FIG. 1, a warning light 2 of the present disclosure includes generally a dome 4 adapted to be attached to a base member 6. A plurality of light modules 8 are mounted in and secured to the dome 4 by individual brackets 10. As shown in the drawings, especially FIG. 5, there may be six such light modules 8, two modules 8 positioned along each side of the dome 4 and one module 8 at each end thereof. It is to be understood that other numeric configurations and arrangements may be used.

More specifically, the dome 4 may be fabricated from any suitable plastic such as a shatter resistant molded polycarbonate. The base member 6 may be fabricated from a similar type plastic material, or it may be a metallic base fabricated from a suitable material such as aluminum.

In the embodiment shown in the drawings, the dome 4 is generally rectangular and includes a top surface 12, spaced side walls 14 and 16 and opposed end walls 18 and 20. The side walls 14 and 16 and end walls 18 and 20 may include optical spreader bands 22 depending upon the type of light module 8 being used. Additionally, the dome 4 may be of various colors such as red, green, blue, amber or clear depending upon the color of the light generated by the light module 8 and the color desired by the customer. The dome 4 is removeably connected to the base member 6 by screws 23 extending through the sidewalls 14 and 16 of the dome into the base member 6 as shown.

Figure 2:
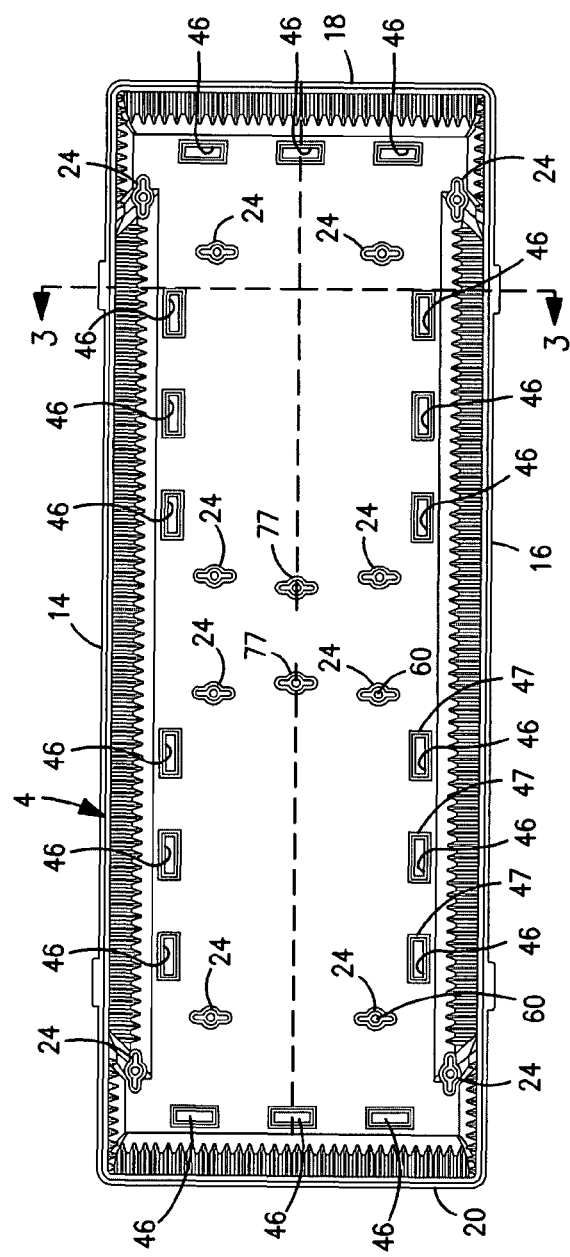
FIG. 2 is a bottom view looking upwardly into the dome of the warning light of FIG. 1.
Figure 3:
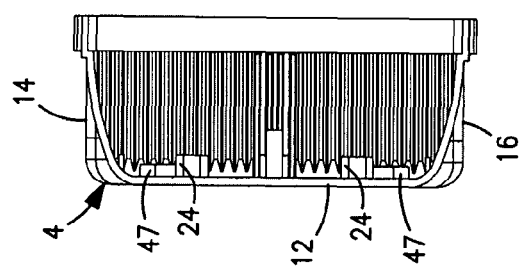
FIG. 3 is a sectional view taken along the lines 3-3 of FIG. 2.
Figure 4:
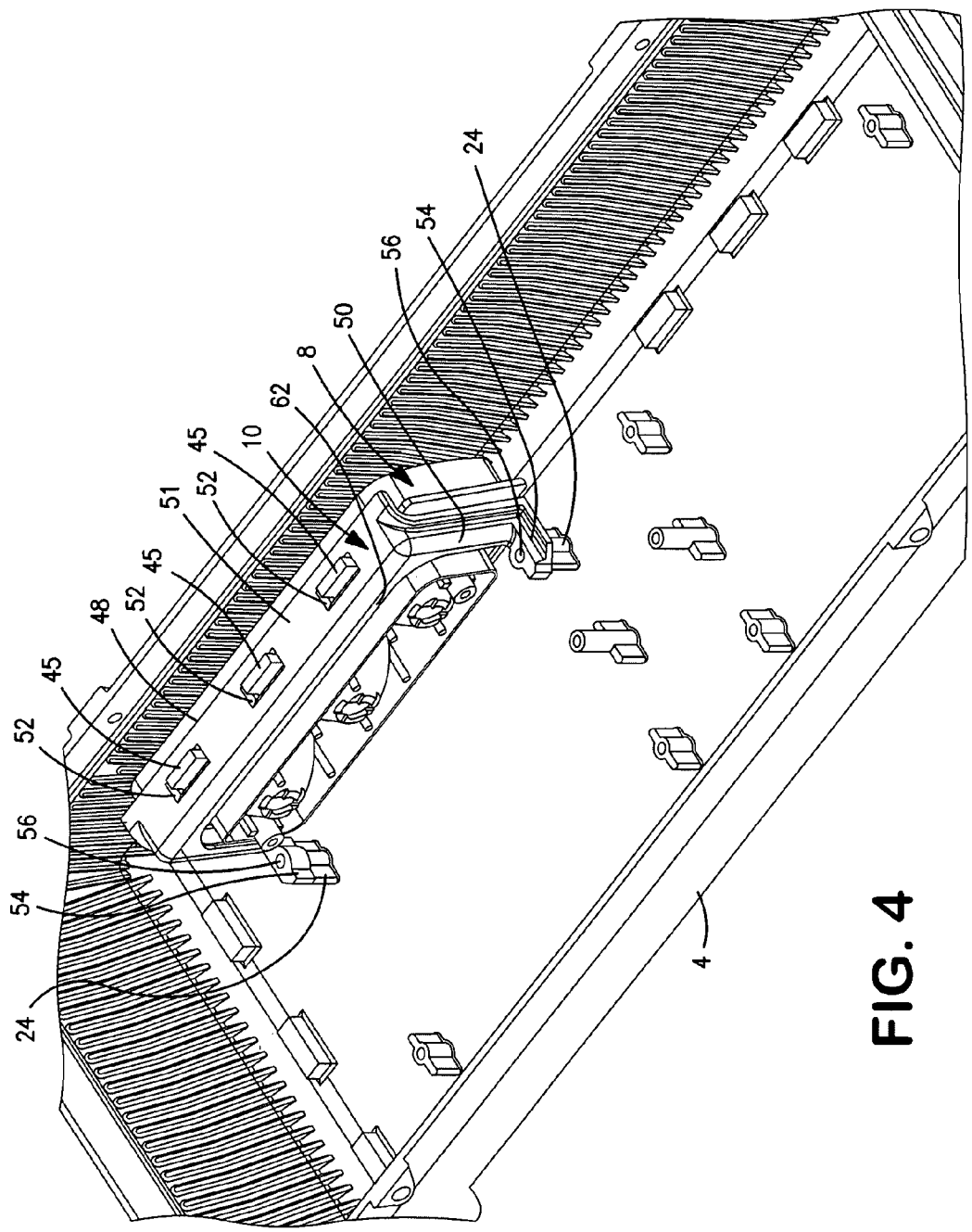
FIG. 4 is a partial isometric view looking up into the dome of the warning light showing one light module mounted in the dome.

As shown particularly in FIGS. 2 and 4, the inside of the top surface 12 of the dome 4 is provided with downwardly extending posts 24. There are a set of two posts 24 associated with each light module 8. As shown especially in FIG. 2, there are two such sets extending along each of the opposed side walls 14 and 16 and a single set 26 extending along each of the end walls 18 and 20. The posts 24 serve as an attachment points for the brackets 10 that secure the light modules 8 in the dome 4.

Figure 6:
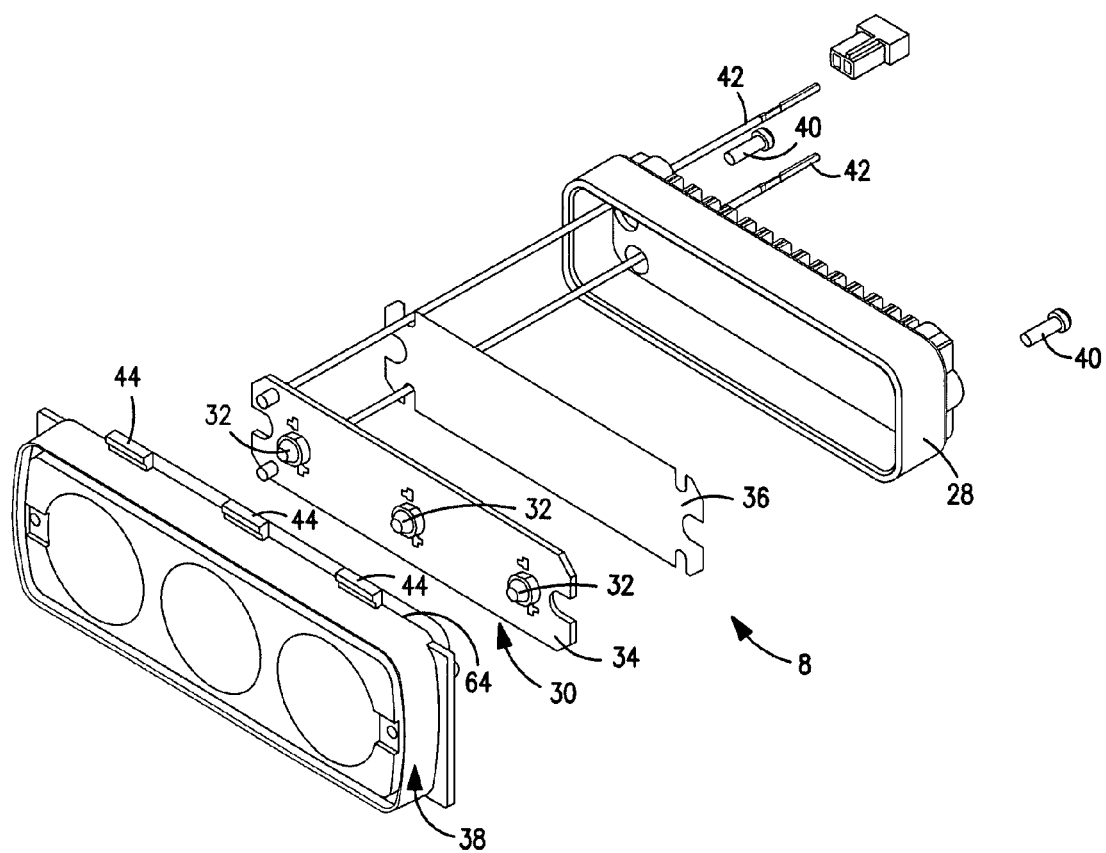
FIG. 6 is an exploded isometric view of an individual light module used in the warning light of FIGS. 1-5.

FIG. 6 shows a general configuration of one type of light module 8 that may be used in the warning light 2 of the present disclosure. Generally, the light module 8 may comprise a housing 28 in which a LED array 30 is mounted. The LED array 30 may generally comprise a plurality of LEDs 32 mounted on a PC board 34 which also may include the appropriate printed circuit (not shown). The particular LED array 30 shown includes three LEDs, although the number of LEDs may vary. A thermal insulator 36 is mounted against the back of the PC board 34. A reflector 38 is attached to the front of the housing by suitable screw members 40 as shown. Appropriate wiring 42 extends into the housing 28 and has its inner end attached to the PC board 34.

The reflector 38 is provided with a plurality of tabs 44 extending from its top surface and a similar plurality of tabs 45 extending from its bottom surface. The dome 4 is provided with a plurality of recesses 46, as shown particularly in FIG. 2, that extend into lugs 47 projecting inwardly from the inside of the top surface 12 for reception of the tabs 44 that extend upwardly from the top surface of the reflector 38. As shown in FIG. 4, there are three tabs 44 extending from the top surface of each reflector 38 and three associated recesses 46 in the surface of the dome 4 for each light module 8. The upwardly extending tabs 44 and associated recesses 46 serve to locate the light modules 6 within the dome 4.

The light modules 8 are secured within the dome 4 by means of the bracket 10. The bracket 10 comprises a crossbar 48 with upwardly extending legs 50 at each end. The crossbar 48 includes a generally planar portion 51 that contains a plurality of slots 52 adapted to receive the tabs 45 extending downwardly from the bottom surface of the reflector 38 of the warning light 2. As shown particularly in FIGS. 4 and 5, there are three such tabs 45 each extending into a respective slot 52 in each bracket 10.

Each of the legs 50 of the bracket 10 extend upwardly and terminate in a foot portion 54 that extends transversely to the leg 50 and which has a bore 56 through which self-tapping mounting screws 58 extend. The mounting screws 58 are threaded into the bores 60 (FIG. 2) in the posts 24 to secure the brackets 10 to the dome. Each bracket 10 may be provided with an upwardly extending flange or rim 62 which engages the rear surface 64 of the reflector 38 when the bracket 10 connects the light module 8 to the dome 4.

Referring to FIG. 1, the base member 6 may be connected to the vehicle in various ways including magnetically or by direct connection. In the case of the former, the base member 6 may include a plurality of circular magnets 68, one positioned adjacent each of the four corners of the base member 6 and secured to the underside of the base member by screws 70 threaded into bosses 72 on the underside of the base member 6 as shown. If it is desired to more permanently secure the base member to the vehicle, screws 74 may extend from the top side of the base member 6 through the bosses 72 and directly into the vehicle. A mounting gasket (not shown) may be attached to the bottom of the base member if, for example, the warning light 2 is to be attached to the roof of a vehicle. Additionally, the base member 6 may be connected to a bracket (not shown) having a suction cup thereon as another means of attachment.

Figure 8:
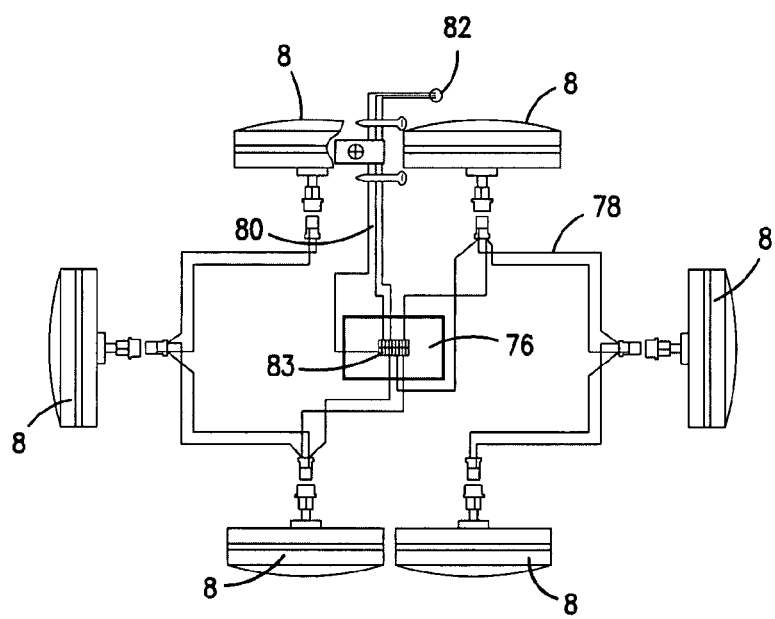
FIG. 8 is a schematic wiring diagram showing the electrical connection of the light modules and electrical input.

As shown in FIG. 8, the various light modules 8 are interconnected together and to a flasher 76 by a suitable wiring harness 78. The flasher 76 may be attached to center posts 77 extending from the underside of the upper surface 12 of the dome 4 by suitable screw members 79. A power cord 80 extends through a suitable aperture 82 in the base member 8. It inner end is connected to the flasher 76 through a suitable connector 83 such as a six position mini-universal mate-a-lock connector to provide a detachable connection to the flasher 76. The other end of the power cord 80 may be directly connected to the electrical system of the vehicle or may be provide with a cigar plug (not shown) for connection into the cigarette lighter outlet of the vehicle depending upon the choice of the customer.

Figure 7:
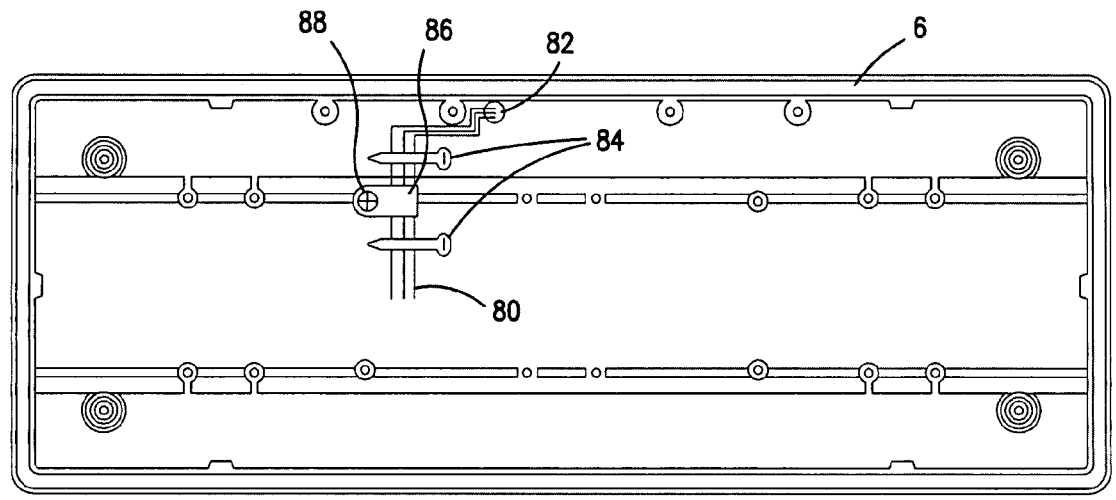
FIG. 7 is a top view of the base member of the warning light.

The power cord 80 may comprise three wires that are held together by two wire ties 84 spaced apart as shown in FIG. 7. A cable clamp 86 surrounds the three wires at a point intermediate the wire ties 84 and is attached to the inside of the bottom surface of the base by a suitable screw 88. The provision of the cable clamp 86 provides a strain release for the power cord 80 in that it will limit the movement of the wires of the power cord 80 and prevent stress on the flasher input connection. The wire ties 80 will not pass through the cable clamp.

With the above described arrangement, the light modules 10 may be replaced by separating the dome 4 from the base member 6, detaching the power cord 80 from the flasher 76 and taking the dome 4 and attached light modules 8 to a convenient location for work while leaving the base member 6 with the vehicle.

While various embodiments have been shown and described, various modifications and substitutions may be made thereto. Accordingly, it is understood that the present embodiments have been described by way of illustration and not of limitation.

What is claimed is:

1. A warning light comprising
   a base member;
   a dome connected to said base member;
   a plurality of light modules each having a top surface, bottom surface and opposite sides positioned in said dome and secured thereto; and
   a bracket member associated with each of said light modules and securing said light module within said dome, each of said bracket members including a base positioned against said bottom surface of said light module and a set of legs, one leg extending along each of said opposite sides of said light module and terminating in an end portion, said end portion being connected to said dome.

2. The warning light of claim 1 wherein said light module top surface has at least one tab thereon, said dome having a recess in which said tab on said top surface is received.

3. The warning light of claim 1 wherein said light module bottom surface has at least one tab thereon, said base portion of said bracket having a slot in which the tab on said bottom surface is received.

4. The warning light of claim 1 wherein said top and bottom surfaces each has at least one tab thereon, said dome having a recess in which said tab on said top surface is received and said base portion of said bracket having a slot in which the tab on said bottom surface is received.

5. The warning light of claim 4 wherein there are three tabs on each of the top and bottom surfaces.

6. The warning light of claim of claim 1 further including a flasher unit mounted in said dome, a wiring harness interconnecting said light modules and said flasher, and a power cord extending from said flasher through an aperture in said base member.

7. The warning light of claim 6 wherein said power cord has a detachable connection with said flasher.

8. The warning light of claim 1 wherein said dome is rectangular with at least one light module associated with each side of said rectangle.

9. The warning light of claim 6 further including a clamp attached to said base through which said power cord passes and wire ties about said power cord on either side of said clamp which are incapable of passing though said clamp.

10. The warning light of claim 9 wherein said clamp is attached to said base at a point before said power cord passes through said aperture to the outside of said warning light.

11. A warning light comprising
    a base member;
    a dome removeably connected to said base member, the dome having an upper inside surface;
    at least one light module having a top and bottom surface positioned within said dome, said top surface of said light module being positioned against the upper inside surface of said dome; and
    a bracket member securing said light module to said dome, said bracket member including a cross bar engaging the bottom surface of said light module and legs extending upward from said cross bar and terminating in a foot portion which is attached to the upper inside surface of said dome.

12. The warning light of claim 11 wherein said top and bottom surfaces of said light module each have at least one tab thereon, said dome upper inside surface having a recess in which said tab on said top surface is received and said cross bar of said bracket has a slot in which the tab on said bottom surface is received.

13. The warning light of claim 11 wherein there are three tabs on both the top and bottom surfaces of each light module.

14. The warning light of claim of claim 12 further including a flasher unit mounted in said dome, a wiring harness interconnecting said light modules and said flasher, and a power cord extending from said flasher through an aperture in said base member.

15. The warning light of claim 14 wherein said power cord has a removable connection with said flasher.

16. The warning light of claim 15 wherein said removable connection comprises a plug member.

17. The warning light of claim 15 further including a strain relief on said power cord to prevent stress on the connection of the power cord to said flasher.

18. The warning light of claim 17 wherein said means for providing strain relief comprises a clamp attached to said base and through which said power cord passes and wire ties about said power cord on either side of said clamp which are incapable of passing though said clamp.

* * * * *